July 16, 1968     I. D. McEACHERN ET AL     3,392,514
STALK PICK-UP DEVICE
Filed Aug. 18, 1965     3 Sheets-Sheet 1
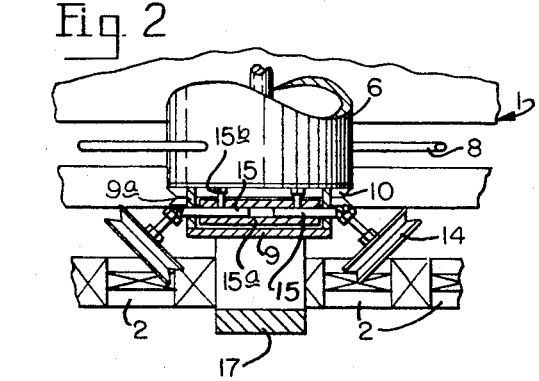
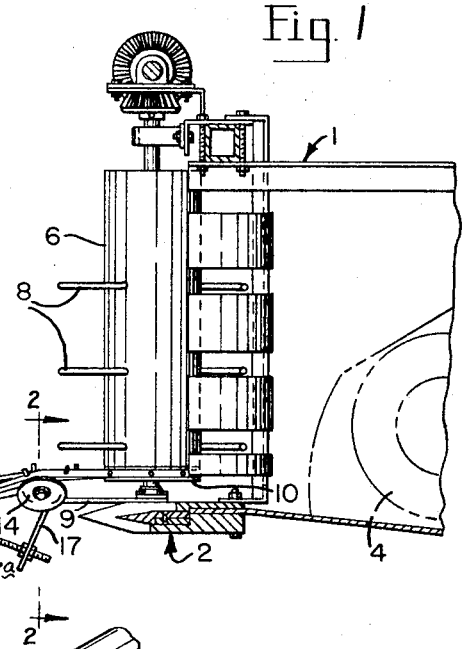
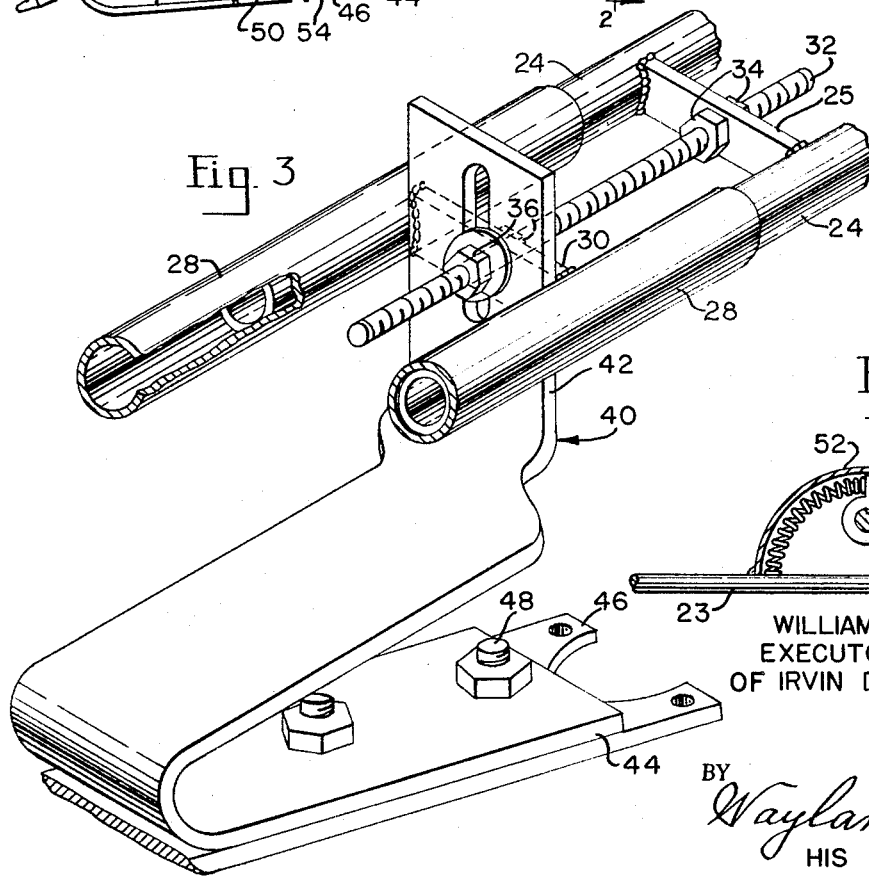
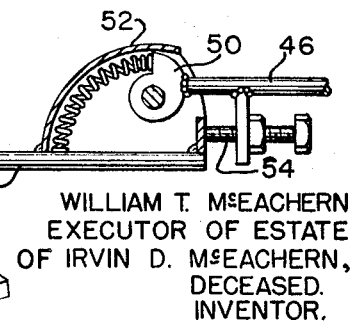
WILLIAM T. McEACHERN
EXECUTOR OF ESTATE
OF IRVIN D. McEACHERN,
DECEASED.
INVENTOR.
BY Wayland D. Keith
HIS AGENT

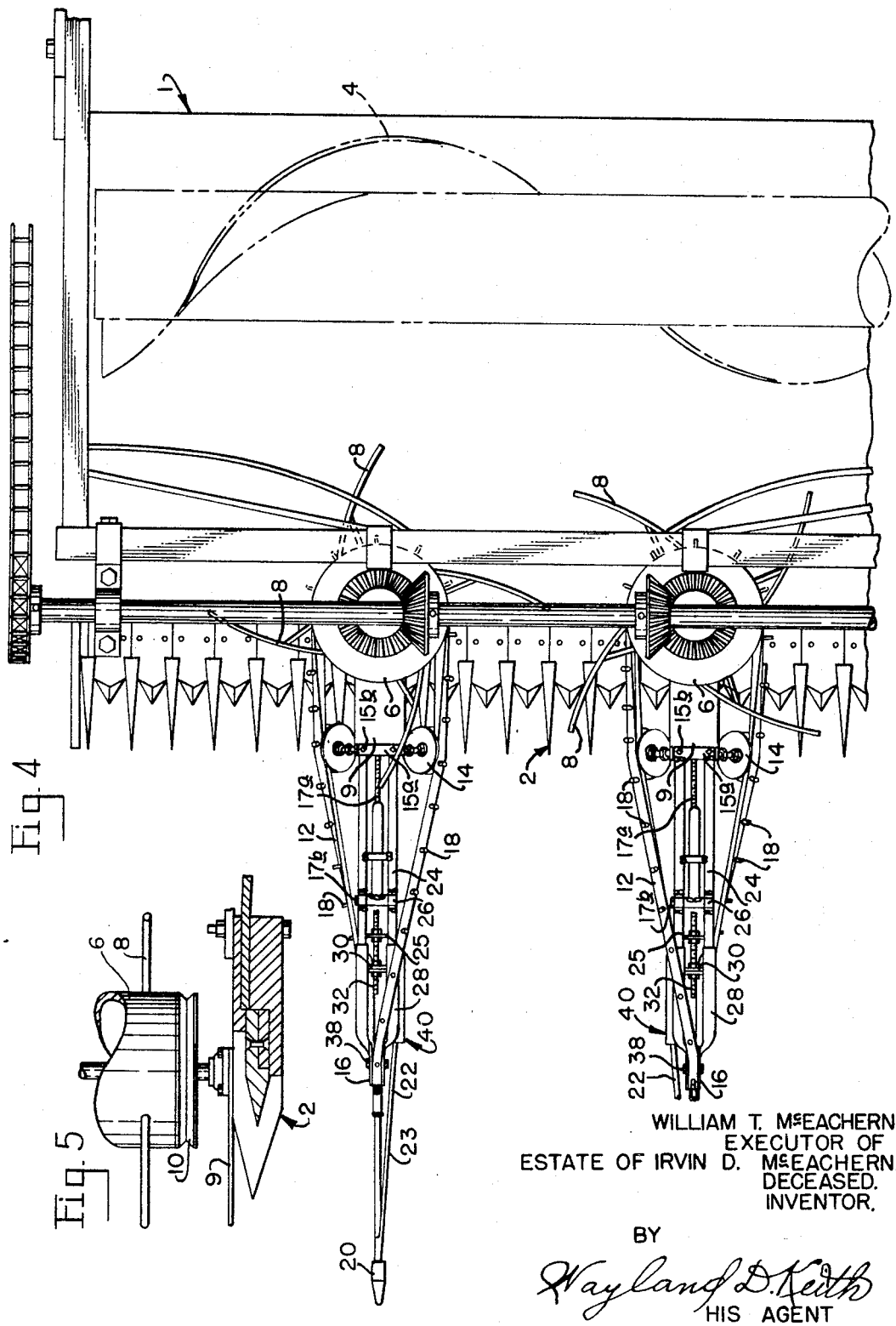

July 16, 1968  I. D. McEACHERN ET AL  3,392,514
STALK PICK-UP DEVICE
Filed Aug. 18, 1965  3 Sheets-Sheet 3
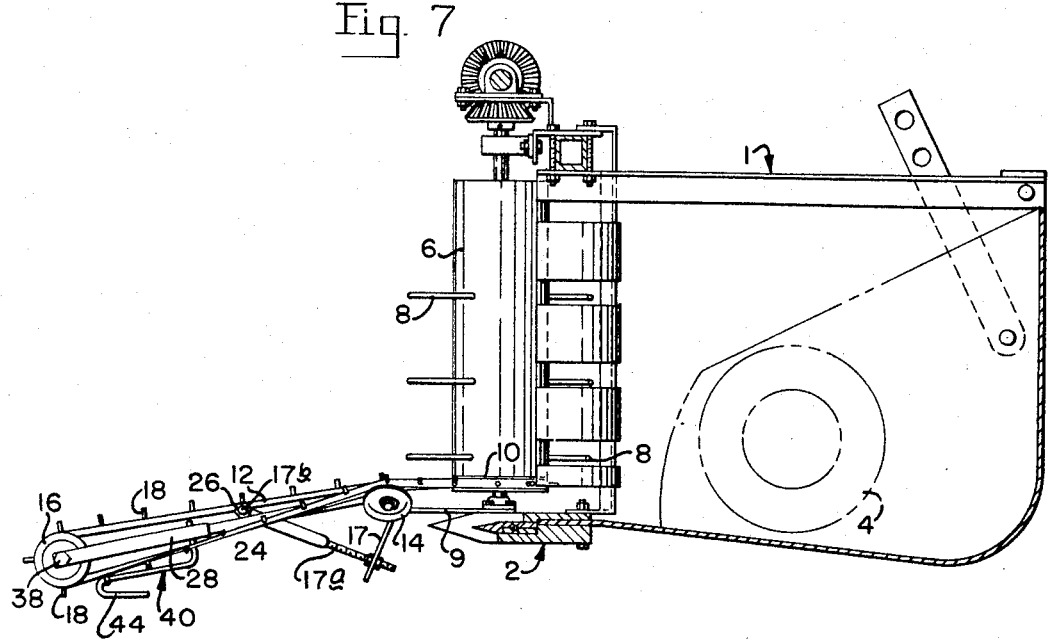
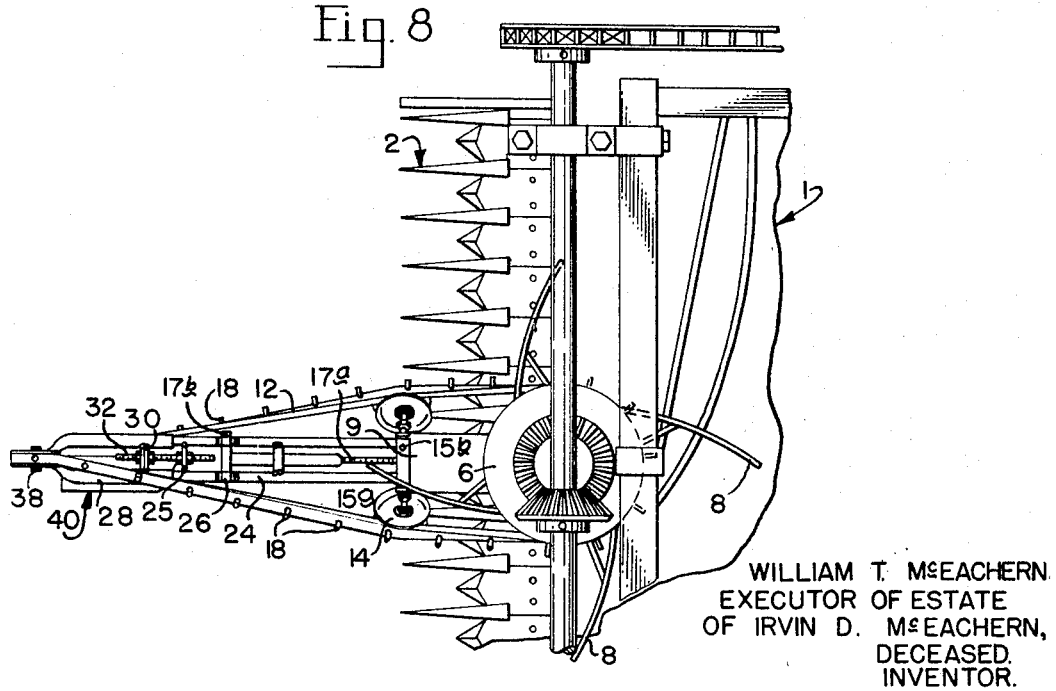
WILLIAM T. McEACHERN
EXECUTOR OF ESTATE
OF IRVIN D. McEACHERN,
DECEASED.
INVENTOR.
BY
Wayland D. Keith
HIS AGENT

United States Patent Office 3,392,514
Patented July 16, 1968

1

3,392,514
STALK PICK-UP DEVICE
Irvin D. McEachern, deceased, late of Hale Center, Tex., by William T. McEachern, executor, Rte. 2, Hale Center, Tex. 79041
Filed Aug. 18, 1965, Ser. No. 480,822
12 Claims. (Cl. 56—98)

This invention relates to improvements in stalk pick-up devices, and more particularly to stalk pick-up devices for use with a conventional broadcast type combine, whereby leaning stalks will be raised to near standing position, and will be directed into the gathering mechanism for cutting by the sickle of the combine.

Various stalk pick-up devices have been proposed heretofore, however, these have not been universally accepted for one reason or another.

The present stalk pick-up device is so constructed that it may be readily adapted to various conditions, to pick up both short and long stalks into an upright position to enable the stalks to be directed, by the gathering mechanism of the combine, into contact relation with the sickle for the stalks to be cut thereby and directed into the combine mechanism.

An object of this invention is to provide a stalk pick-up device which will readily lift the stalks from a bent or leaning position into an upright position, to enable the stalks to be brought into cutting relation with the sickle of the combine.

Another object of the invention is to provide a stalk pick-up device for attachment to a "broadcast" type combine, whereby the broadcast type combine may be used to cut row grains having leaning stalks or stalks disposed at substantially ground level.

Still another object of the invention is to provide a stalk pick-up device having a resilient member which travels near the ground, as the combine moves over the terrain, which resilient member will yield if it becomes engaged in the ground or if it strikes an object.

A further object of the invention is to provide a stalk pick-up device, for use with broadcast type combines, which will mechanically direct the stalks into contact relation with the sickle of the combine to be severed thereby and directed into the combine mechanism for the threshing of the grain therefrom.

Yet another object of the invention is to provide an attachment for a combine, which attachment is flexible in use and which enables a portion thereof to be removed, to enable another portion thereof to function as a stalk pick-up, under certain conditions.

With these objects in mind and others which will become manifest as the description proceeds, reference is to be had to the accompanying drawings in which like reference characters designate like parts in the several views thereof, in which:

FIG. 1 is a fragmentary, longitudinal, sectional view through a combine, with parts shown in elevation and with parts thereof being broken away to bring out the details of construction;

FIG. 2 is an enlarged sectional view taken on the line 2—2 of FIG. 1, looking in the direction indicated by the arrows;

FIG. 3 is an enlarged, fragmentary, perspective view of the conveyor belt tightening mechanism, showing the manner of adjusting a support shoe therefrom;

FIG. 4 is an enlarged fragmentary plan view of a portion of a combine, showing the stalk pick-up device attached to the combine;

FIG. 5 is an enlarged cross-sectional view through the sickle of the combine, showing the stalk gathering cylinder mounted on the lower end thereof, and a V-belt drive pulley attached thereto;

FIG. 6 is an enlarged, fragmentary, elevational view of the joint of the pick-up finger mounting bar, with parts being broken away and shown in section to bring out the details of construction;

FIG. 7 is an enlarged view of a modified arrangement of the stalk pick-up device; and FIG. 8 is a top plan view of the modified form of the device as shown in FIG. 7.

With more detailed reference to the drawings, the numeral 1 designates generally a conventional broadcast type combine having a sickle 2 thereon to cut the stalks of grain and a conveyor mechanism 4 to convey the cut stalks into the threshing machanism of the broadcast type combine 1. A stalk gathering mechanism utilizes pairs of cylinders 6 mounted above the sickle 2 in such manner that the fingers 8 thereof will direct the stalks from rows into contact with the reciprocating sickle 2 to enable the stalks to be severed. The above mentioned stalk gathering cylinders 6 are of the character as set forth in Patent No. 2,929,185 issued March 22, 1960, Gathering Attachment for Combines, and Patent No. 2,948,100, issued Aug. 9, 1960, Grain Gathering Attachment for Combines.

The present stalk pick-up device is so designed that the conveyor belts thereof are driven directly from the cylinders 6 by a V-belt pulley 10, with a V-shaped conveyor belt passing therearound and over angularly disposed V-belt idler pulleys 14, so as to direct one reach of the V-belt form of conveyor to a point beneath V-belt pulley 16, and the other reach of the V-belt conveyor will be directed to a point above V-belt pulley 16.

A support bar 9 is secured to the stationary frame portion of sickle 2 and extends outwardly from the frame of the sickle 2 immediately below each of the cylinders 6, and supports V-belt idler pulleys 14 thereon, which pulleys 14 are mounted on shafts 15, which shafts 15 are adjustable longitudinally within tubular member 15a. The shafts 15 are held in adjusted relation by screws 15b which pass through the tubular member 15a and engage the shaft 15. Apertured lugs 9a are upturned on each side of support bar 9 to enable shafts 15 to pass therethrough.

The V-shaped conveyor belt 12 has pins 18 extending outwardly therefrom for engagement with stalks with which the V-belt 12 comes in contact, and since the V-shaped conveyor belt 12 is geared to move at approximately the same linear speed as the speed of the combine as it traverses the terrain, the stalks will be lifted by resilient guide finger 20 and directed onto guide bar 22, to be moved therealong and onto V-shaped conveyor belt 12. The guide bar 22 angles inwardly toward the row so as to assist in bringing the stalks into upright position and conveying them onto the side of the V-shaped conveyor belt 12, which will direct the stalks into the path of the fingers 8 on the cylinders 6, which fingers 8 and V-shaped conveyor belt 12 will direct the stalks into contact relation with sickle 2 to be severed thereby. The fingers 8 on cylinders 6 will then direct the cut stalks rearward for action thereupon by conveyor 4.

An apertured lug 17 extends downward from support bar 9 and has a screw threaded bolt 17a passing therethrough. The other end of bolt 17a pivotally receives a pin 17b, which is mounted between and supports outstanding tubular arms 24, which tubular arms 24 extend outward from tubular member 15a. The pin 17b passes through apertured lugs 26 on tubular arms 24 so as to enable the tubular arms 24 to be supported partially or wholly by screw threaded bolt 17a.

Tubular members 28 are complementally telescoped over the distal end of the respective tubular members of arms 24. An apertured cross bar 25 is positioned between and secured to each of the tubular arms 24 near the distal ends thereof, and an apertured transverse bar 30 is positioned between and secured to the tubular members 28 near the ends thereof and is spaced from apertured cross bar 25 to enable a screw threaded member 32 to pass through the apertures of the respective bars. Then by use of nuts 34 and 36, the tubular members 28 may be urged toward or from tublar arms 24. The distal ends of tubular members 28 are flattened with each flattened end having a transverse aperture formed therein to receive an axial pin or bolt 38 which is adapted to pass through an axial opening in V-belt pulley 16.

A combination support member and guide shoe 40 is adjustably secured to transverse bar 30. The combination support member and guide shoe 40 has an upstanding slotted member 42 secured thereto which may be adjusted relative to transverse bar 30 to vary the height of a runner 44 which forms the lower side of shoe 40 and which normally serves as a support on which to bolt plate 46, by means of bolts 48. The plate 46 extends outward and pivotally mounts a spring 52 against arcuate member 50 in biased relation to urge bar 23 downward to hold the resilient guide finger 20 in close relation with the surface of the terrain, as will best be seen in FIG. 1. The bar 23 is so curved as to form a runner on the lower portion thereof for engagement with the surface of the terrain, however, a screw threaded adjustment bolt 54 is provided to limit the downward travel of bar 23 and resilient guide finger 20.

*Second form of invention*

A second form of invention may be had by disconnecting plate 46 and by adjusting nuts on bolt 17a. The arms 24 and tubular members 28 may be lowered until the lower side of pulley 16 is in close proximity to the ground, whereupon, the bar 23, guide bar 22 and resilient guide finger 20 may be dispensed with. This arrangement enables the stalks to be picked up by the V-shaped conveyor belt 12 and directed into cutting relation with the sickle 2.

It is to be appreciated that the portion detached from runner 44 is such that it may be attached to the sickle 2 beneath the cylinder 6 and used separately as a stalk pickup as set forth in the co-pending application filed as of this date.

While the invention has been described and illustrated in two embodiments thereof, it is to be understood that changes may be made in the minor details of construction and adaptations made to different installations without departing from the spirit of the invention or the scope of the appended claims.

Having thus described the invention, what is claimed is:

1. A stalk pickup attachment for a broadcast combine having a reciprocating sickle and pairs of spaced apart upright, rotating cylinders, which cylinders have fingers thereon, each stalk pickup arrangement comprises:
   (a) a support bar associated with each upright, rotating cylinder,
   (b) a V-belt drive pulley associated with the lower end of each upright cylinder coaxial with the respective cylinders and rotatable therewith,
   (c) a pair of angulated, rotatable V-belt idler pulleys journaled on each said support bar near the outer end thereof and being spaced apart laterally,
   (d) an arm extending forwardly from the outer end of each said support bar,
   (e) a V-belt idler pulley mounted near the distal end of each said forwardly extending arm and being rotatable about a substantially horizontal axis, and
   (f) an endless V-belt conveyor surrounding said V-belt pulley on each cylinder and passing over said angulated, idler pulleys and over said idler pulley on the distal end of each arm in driving relation.

2. A stalk pickup attachment as set forth in claim 1, wherein:
   (a) each said arm comprises a pair of spaced apart, extensible tubular members,
   (b) adjuctment means associated with said extensible tubular members to impart relative longitudinal movement between extensible portions of said pair of extensible members to adjust the relative distance between said V-belt idler pulley, mounted near the respective distal ends of each said arm, and said V-belt drive pulley associated with each cylinder.

3. A stalk pick-up attachment as defined in claim 2, wherein:
   (a) an apertured lug extends downward from each said support bar, and
   (b) screw threaded adjustment means is interposed between said tubular members of said outwardly extending arm and each downwardly extending lug to adjustably support the outer end of each said arm.

4. A stalk pick-up attachment as defined in claim 1, wherein:
   (a) said V-belt idler pulleys on each support bar have the axes thereof positioned at an acute angle with respect to the vertical so as to direct the endless V-belt conveyor from a horizontal plane to a substantially vertical plane.

5. A stalk pick-up attachment as defined in claim 1, wherein:
   (a) each said arm has a downwardly extending bracket attached thereto near the distal end thereof,
   (b) a further support bar secured to each said downwardly extending bracket, and
   (c) a forwardly extending stalk pick-up finger pivotally mounted on each said further support bar and extending forward of each said arm.

6. A stalk pick-up attachment as defined in claim 5, wherein:
   (a) the outer end of each said stalk pick-up finger has resilient means associated therewith to urge said fingers into close proximity to the terrain.

7. A stalk pick-up attachment as defined in claim 5, wherein:
   (a) each said forwardly extending pick-up finger has an elastomer tip on the forward end thereof, and
   (b) wherein each said pick-up finger has a curved runner thereon intermediate the pivot mounting thereof and the outer tip.

8. A stalk pick-up attachment as defined in claim 5, wherein:
   (a) each said finger has an upwardly and inwardly diverging stalk guide bar to direct stalks onto said endless conveyor to be directed between said upright cylinders.

9. A stalk pick-up attachment as defined in claim 5, wherein:
   (a) said outwardly extending finger has a screw-threaded attachment associated therewith and with said support bar to support the outer end of said pick-up finger.

10. A stalk pick-up attachment as defined in claim 5, wherein:
    (a) said forwardly extending finger is detachably connected to said arm.

11. A stalk pick-up attachment as defined in claim 1, wherein:

(a) each said V-belt has spaced apart outwardly extending pins thereon.

12. A stalk pick-up attachment as defined in claim 1, wherein:
(a) each said arm has a downwardly extending bracket thereon which extends forwardly and has a re-entrant portion thereon to form a skid to support the outer end of each said arm.

References Cited

UNITED STATES PATENTS 2,835,097  5/1958  Sullivan _____ 56—98
2,970,420  2/1961  Schmidt _____ 56—98

ABRAHAM G. STONE, *Primary Examiner.*

R. C. HARRINGTON, *Assistant Examiner.*